(12) United States Patent
Bathe et al.

(10) Patent No.: US 11,307,397 B2
(45) Date of Patent: Apr. 19, 2022

(54) HIGH-RESOLUTION CONFOCAL MICROSCOPE

(71) Applicant: Carl Zeiss Microscopy GmbH, Jena (DE)

(72) Inventors: Wolfgang Bathe, Jena (DE); Stanislav Kalinin, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 208 days.

(21) Appl. No.: 16/650,252

(22) PCT Filed: Sep. 25, 2018

(86) PCT No.: PCT/EP2018/075991
§ 371 (c)(1),
(2) Date: Mar. 24, 2020

(87) PCT Pub. No.: WO2019/068519
PCT Pub. Date: Apr. 11, 2019

(65) Prior Publication Data
US 2021/0373306 A1    Dec. 2, 2021

(30) Foreign Application Priority Data

Oct. 2, 2017 (DE) .................... 10 2017 122 858.6

(51) Int. Cl.
*G02B 21/00* (2006.01)
(52) U.S. Cl.
CPC ....... *G02B 21/008* (2013.01); *G02B 21/0032* (2013.01); *G02B 21/0036* (2013.01); *G02B 21/0072* (2013.01)
(58) Field of Classification Search
CPC ............. G02B 21/008; G02B 21/0032; G02B 21/0036; G02B 21/0072; G02B 21/00;
(Continued)

(56) References Cited

U.S. PATENT DOCUMENTS

| | | |
|---|---|---|
| 2011/0267688 A1 | 11/2011 | Kleppe et al. |
| 2015/0077842 A1 | 3/2015 | Kleppe et al. |

(Continued)

FOREIGN PATENT DOCUMENTS

| | | |
|---|---|---|
| DE | 10 2013 015 933 A1 | 3/2015 |
| DE | 10 2015 111 702 A1 | 1/2017 |

(Continued)

OTHER PUBLICATIONS

Huff, Joseph, et al.; "The Airyscan Detector from ZEISS. Confocal Imaging with Improved Signal-to-Noise Ratio and Superresolution"; Technology Note Jul. 2015.

(Continued)

*Primary Examiner* — Arnel C Lavarias
(74) *Attorney, Agent, or Firm* — Duane Morris LLP (57) ABSTRACT

A method for the high-resolution scanning microscopy of a specimen where the specimen is illuminated with illuminating radiation such that the illuminating radiation is focused to a diffraction-limited illuminating spot at a point in or on the specimen. The point is projected in a diffraction-limited manner in a diffraction image onto a flat panel detector having pixels. The flat panel detector, owing to the pixels thereof, have a spatial resolution which resolves a diffraction structure of the diffraction image. The point is shifted relative to the specimen into different scanning positions by an increment which is smaller than the diameter of the illuminating spot and a 3D image is generated. The pixels of the flat panel detector are divided into groups. A precalculated raw image is calculated for each group and are unfolded three-dimensionally to generate the image of the specimen.

13 Claims, 10 Drawing Sheets

(58) Field of Classification Search
CPC .............. G02B 21/0004; G02B 21/002; G02B 21/0024; G02B 21/0052; G02B 21/006; G02B 21/0076; G02B 21/36; G02B 21/361; G02B 21/365; G01N 21/64; G01N 21/6456; G01N 2021/6463
USPC ................................ 359/368, 362, 363, 369
See application file for complete search history.

(56) References Cited

U.S. PATENT DOCUMENTS

| | | | |
|---|---|---|---|
| 2015/0077844 A1* | 3/2015 | Singer ................ | G02B 21/0032 359/385 |
| 2018/0196245 A1 | 7/2018 | Kleppe et al. | |
| 2020/0301121 A1* | 9/2020 | Kalinin ................ | G02B 21/002 |

FOREIGN PATENT DOCUMENTS

| | | | |
|---|---|---|---|
| EP | 2 317 362 A1 | 5/2011 | |
| EP | 2 860 566 A2 | 4/2015 | |
| JP | 3837495 B2 * | 10/2006 | |
| WO | WO-2017161055 A2 * | 9/2017 | ......... G02B 27/0075 |

OTHER PUBLICATIONS

Weisshart, Klaus; "The Basic Principle of Airyscanning"; Technology Note Jul. 31, 2014.
International Search Report dated Dec. 17, 2018.

* cited by examiner

Fig. 1

Fig. 2b
$h = 1,2 \ldots 32$

Fig. 5 simulation parameters: NA=1.4; n=1.518; PH=1.5 AU

Fig. 6c $c = \{1 \ldots 4\}$ $h(1) = \{1\}$
$h(2) = \{2 \ldots 7\}$
$h(3) = \{8 \ldots 19\}$
$h(4) = \{20 \ldots 32\}$

HIGH-RESOLUTION CONFOCAL MICROSCOPE

RELATED APPLICATIONS

The present application is a U.S. National Stage application of International PCT Application No. PCT/EP2018/075991 filed on Sep. 25, 2018, which claims priority benefit of German Application No. DE 102017122858.6 filed on Oct. 2, 2017, the contents of each are incorporated by reference in their entirety.

FIELD OF THE INVENTION

The invention relates to a method for high-resolution scanning microscopy of a sample, wherein the sample is illuminated with illumination radiation in such a way that the illumination radiation is focused to a point in or on the sample to form a diffraction-limited illumination spot. The point is imaged in diffraction-limited fashion into a diffraction image onto a 2D detector having pixels wherein, owing to its pixels, the 2D detector has a spatial resolution that resolves a diffraction structure of the diffraction image. The point is displaced relative to the sample into different scanning positions with an increment less than the diameter of the illumination spot, the 2D detector is read, and a 3D image of the sample is generated from the data of the 2D detector and from the scanning positions assigned to said data, said image having a resolution that is increased beyond a resolution limit for imaging.

The invention further relates to a microscope for high-resolution scanning microscopy of a sample, having an illumination beam path for illuminating the sample with illumination radiation in such a way that the illumination radiation is focused to a point in or on the sample to form a diffraction-limited illumination spot. An imaging beam path is provided for diffraction-limited imaging of the points into a diffraction image onto a 2D detector having pixels. Owing to its pixels, the 2D detector has a spatial resolution that resolves a diffraction structure of the diffraction image. A scanning device is used for displacing the point relative to the sample into different scanning positions with an increment less than the diameter of the illumination spot, and an evaluation device for generating a 3D image of the sample from the data of the 2D detector and from the scanning positions assigned to said data, wherein the image has a resolution that is increased beyond a resolution limit of the image.

BACKGROUND OF THE INVENTION

A typical implementation of light microscopy is laser scanning microscopy (in short also LSM), which uses a confocal detection arrangement to image only that plane of the sample that is situated in the focal plane of the objective. An optical section is obtained, the thickness of which depends on the size of the confocal pinhole. Taking multiple optical sections at different depths of the sample enables the generation of a three-dimensional image of the sample, which is then composed of the different optical sections. Laser scanning microscopy is therefore suitable for examining thick specimens.

In principle, the optical resolution of a light microscope, including that of an LSM, is diffraction-limited by physical laws. Here, the term "high-resolution" is used for resolutions beyond the diffraction limit. Overcoming the diffraction limit is achieved by what is known as Airy scan microscopy, which is described e.g. in EP 2317362 A1. This document combines, in the embodiment illustrated and described in FIG. 5 therein, diffraction-limited illumination of the sample with a 2D detector, wherein a scanning device is configured such that the diffraction image of the point that is illuminated with the illumination spot rests on the 2D detector. This arrangement is referred to as a so-called "de-scanned" detector arrangement. It is typically achieved by disposing a scanner that deflects the beam path between the sample and the combination point of illumination device and imaging device. Such a scanner acts both on the illumination spot and on the imaging of the point that is illuminated with the illumination spot, with the result that the beam path in the imaging direction downstream of the scanner is static. An alternative to such a scanner is the use of a movable sample stage which displaces the sample. The diffraction image is static on the 2D detector even then. According to the concept of EP 2317362 A1, the 2D detector is provided with a spatial resolution that allows the resolution of the structure of the diffraction image.

OBJECTS AND SUMMARY OF THE INVENTION

It is an object of the invention to develop a method and a microscope of this type in such a way that the image acquisition is accelerated.

The invention is defined in the annexed claims.

The invention provides a method for high-resolution scan microscopy of a sample in accordance with the Airy scan principle. The sample is illuminated with illumination radiation. In the process, the illumination radiation is focused to a point in or on the sample to form a diffraction-limited illumination spot. This point is imaged in a diffraction-limited fashion into a diffraction image on a 2D detector. The 2D detector has pixels and consequently a spatial resolution that resolves a diffraction structure of the diffraction image. The point is displaced relative to the sample into different scanning positions. An increment between successive scanning positions is here less than the diameter of the illumination spot, whereby each point of the sample is multiple times part of differently located illumination spots and diffraction images. The 2D detector is read. An image of the sample is generated from the data obtained in the process and from the scanning positions assigned to said data. The image has a resolution in accordance with the Airy scan principle that is increased beyond a resolution limit of the imaging. The diffraction limit is consequently overcome.

The data is evaluated in two stages in order to speed up the process. The data of the 2D detector correspond to the data of the pixels, i.e., the signals of each of the pixels. To this end, the pixels of the 2D detector are divided into at least two groups. The groups comprise a central group that is located on an optical axis. The central group thus covers a central zone. A further group surrounds the central group in form of a ring. The zone assigned to this ring-shaped surrounding group thus surrounds the zone of the central group in form of a ring. For each group, a pre-processed raw image is calculated. The pre-processed raw images are deconvoluted collectively in order to generate the high-resolution image of the sample. The evaluation process is therefore carried out in two stages in order to accelerate the method, first individually for the respective groups or the zones of the 2D detector assigned thereto and then at group level. This yields an acceleration of the image evaluation.

Analogously to the method, a corresponding microscope is provided, which comprises an illumination beam path for illuminating the sample with said properties and an imaging beam path for diffraction-limited imaging of the point into a diffraction image on the 2D detector with its pixels. The evaluation device for generating an image of the sample from the data of the 2D detector and the scanning positions assigned to this data is further configured to divide the pixels of the 2D detector into the aforementioned groups and carry out the evaluation in two stages, i.e., first individually for each group and then at group level.

It may be necessary to form multiple ring-shaped groups in order to achieve a resolution in the z-direction equivalent to "conventional" Airy scan, in which the signal of each detector pixel is processed individually. The processing of the data reduces with an increasing number of groups, but is significantly faster than the conventional calculation in any case. It is therefore preferred not to use only one ring-shaped surrounding group but a plurality thereof, the ring-shaped groups each having a different distance from the central group. A system of ring-shaped groups that surround one another is then provided, said system being arranged around the central group. Four or five groups are particularly preferred.

Furthermore, it is preferably provided that each pixel is assigned to exactly one of the groups.

In a preferred embodiment, the pre-processed raw images of each group are calculated by performing a two-dimensional deconvolution of the data of the 2D detector for each group. The two-stage evaluation then provides for an initial 2D deconvolution for each group and then a 3D deconvolution at group level.

In particular, the sample is excited to emit fluorescence radiation by the illumination in the method or in the microscope. The illumination beam path is then formed as an excitation beam path.

Where the text below explains aspects of the method for microscopy, said aspects equally relate to the evaluation device which is suitably configured to perform the corresponding method steps. The device may be a computer which is implemented with proper software or with proper program code. Conversely, aspects described on the basis of the microscope and its operation equally relate to the method for microscopy.

It is understood that the features mentioned above and the features yet to be explained below can be used not only in the specified combinations, but also in other combinations or on their own, without departing from the scope of the present invention.

BRIEF DESCRIPTION OF THE DRAWINGS

The invention is explained in even more detail below on the basis of embodiments, with reference being made to the appended drawings, which likewise disclose features essential to the invention. These embodiments are only illustrative and should not be construed as restrictive. By way of example, a description of an embodiment with a multiplicity of elements or components should not be construed as meaning that all of these elements or components are necessary for implementation. Rather, other embodiments may also contain alternative elements and components, fewer elements or components or additional elements or components. Elements or components of different embodiments can be combined with one another, unless stated otherwise. Modifications and variations, which are described for one of the embodiments, can also be applicable to other embodiments. In order to avoid repetition, the same elements or corresponding elements in different figures are denoted by the same reference signs and are not explained a number of times. In the figures:

FIGS. 2, 2a and 2b are schematic illustrations of the arrangements of pixels of a detector of the microscope of FIG. 1.

DETAILED DESCRIPTION OF THE INVENTION

Figure 1:
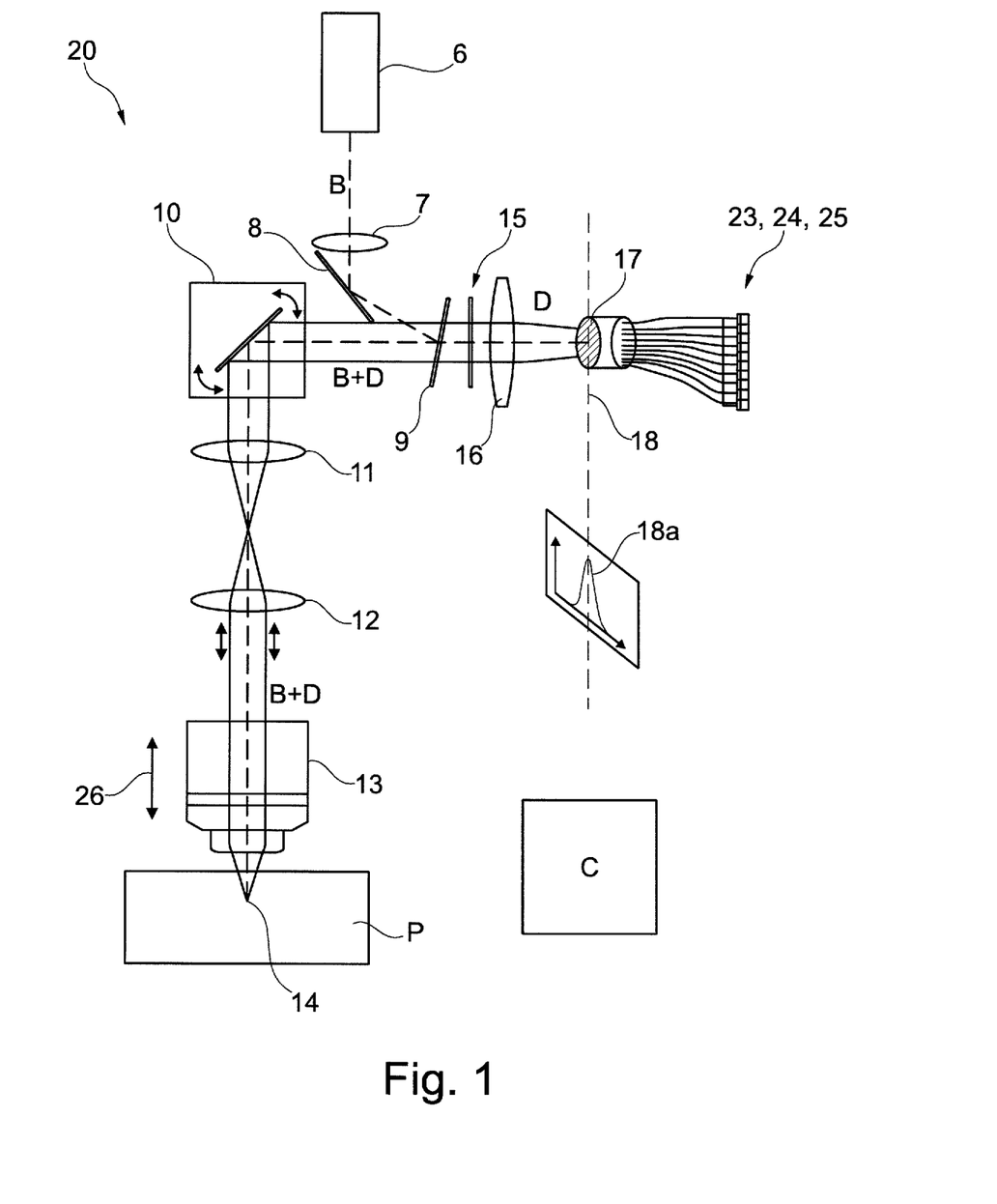
FIG. 1 is a schematic illustration of a microscope for high-resolution microscopy.

FIG. 1 schematically shows a confocal microscope 20 with a high resolution, i.e., a resolution which is increased beyond the diffraction limit in accordance with the principle of so-called Airy scans, as is known e.g. from EP 2317362 A1. It has a light source 6 for illuminating the sample P with an illumination spot 14. The illumination light B is guided via a beam shaping means 7 and a mirror 8 to a beam splitter 9. The beam splitter 9 is configured to reflect as much of the illumination light B as possible and to guide it to a scanner 10. From the scanner 10, the illumination light B is guided via further beam shaping optical units 11 and 12 to an objective 13. The objective 13 focuses the illumination light B to the sample P into an illumination spot 14.

The sample light D produced by the sample in the illumination spot B is collected by the objective 13 and guided, on the reverse path with respect to the illumination light B, to the beam splitter 9. The beam splitter 9 is configured to transmit the greatest possible portion of the sample light D. The sample light D thus transmitted by the beam splitter 9 is passed to the detector 17 via a further filter 15 and a further beam shaping optical unit 16. The detector 17 detects the sample light D, generates electrical signals therefrom and passes them on, via conductors 23, 24, 25, to a control and evaluation device C, e.g., a computer. In this way, a diffraction image 18 is acquired which image is diffraction-limited, as the diffraction structure 18a demonstrates.

In order to obtain an image of the sample P, the illumination spot 14 is moved in point-wise fashion over the sample P by the scanner 10. From the point-related sample signals thus obtained, the control and evaluation device C composes an image which can be presented, e.g., using a monitor. In this set-up, the scanner 10 allows to acquire a two-dimensional image which extends laterally, i.e., in a plane perpendicular to the optical axis of the objective. In order to acquire a three-dimensional image, the distance between the objective 26 and the sample P is varied and a two-dimensional image of the sample P is taken at each distance. The evaluation unit can combine the signals obtained thus to form a three-dimensional image.

Figure 2A:
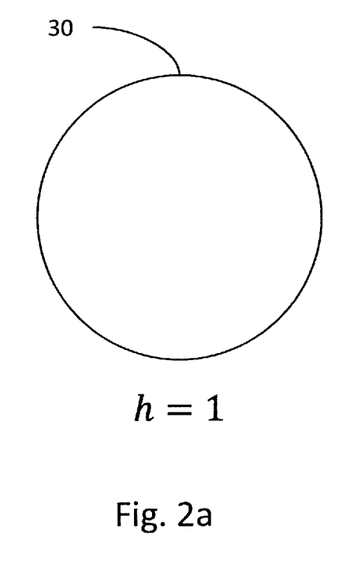
Figure 2B:
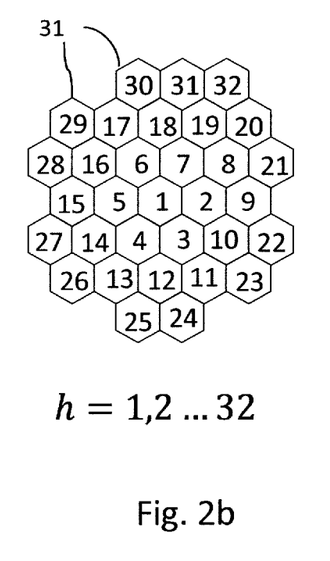

FIGS. 2a and 2b schematically illustrate detectors of a confocal microscope. FIG. 2a shows a conventional detector having a single sensitive surface 30. To achieve the high resolution, the detector 17 of the confocal microscope 20 has a plurality of detection elements or pixels 31, as in FIG. 2b. The elements are numbered; the arrangement has 32 pixels in exemplary fashion.

The size of the pixels 31 is chosen to have pixels significantly smaller than the diffraction image 18 that is generated on the detector 17. At the same time, the number of the pixels 31, and consequently the entire area of the detector 17, is chosen such that a substantial portion of the sample light D can be detected for the diffraction image 18.

For comparison purposes, FIG. 2a indicates a detector with only one element 30, as would be used for a confocal microscope with conventional resolution. Expressed differently, the entire area of the detector covers a large part of the diffraction image 18. The term "conventional resolution" should be understood to mean that the Abbe limit applies to the resolution achieved in this case. By contrast, in the confocal microscope 20 with increased resolution, the illumination and the detection act together so that, in theory, a resolution that is two-times better can be achieved. In practice, the resolution increase is slightly lower, because structures near the resolution limit can be transmitted only with very poor contrast. Realistically, resolutions of up to 1.7 times the Abbe limit can be achieved.

For each scanned point $P(\vec{r},z)$, the detector 17 of the confocal microscope 20 with high resolution captures many detected signals $D_h(\vec{r},z)$, corresponding to the number of the detector elements 31. $\vec{r}$ denotes the lateral sample position, z denotes the axial sample position, the index h denotes the detector element (pixel). The further description assumes 32 pixels; however, a different number of pixels can also be used.

Each of the detector elements 31 captures a raw image signal from the sample P, consisting of the signals $D_h(\vec{r},z)$. The raw image signals differ from one another, the differences being determined by the lateral distance of the illumination light spot relative to the sample region detected by the respective detector element. The raw image signals are described mathematically by a convolution of the "real" sample image $O(\vec{r},z)$ with the point spread function (PSF) $I_h(\vec{r},z)$ of the respective detector element h:

$$D_h(\vec{r},z)=I_h(\vec{r},z)*O(\vec{r},z)$$

It is the function of the evaluation unit C to combine all $D_h(\vec{r},z)$ into an image $\tilde{O}(\vec{r},z)$ corresponding to the original of the sample $O(\vec{r},z)$ as accurately as possible. This is achieved by a deconvolution (DCV) and a subsequent combination of the thus deconvolved raw image signals, wherein the processes of deconvolution and combination can merge into one another in terms of processing.

Figure 3:
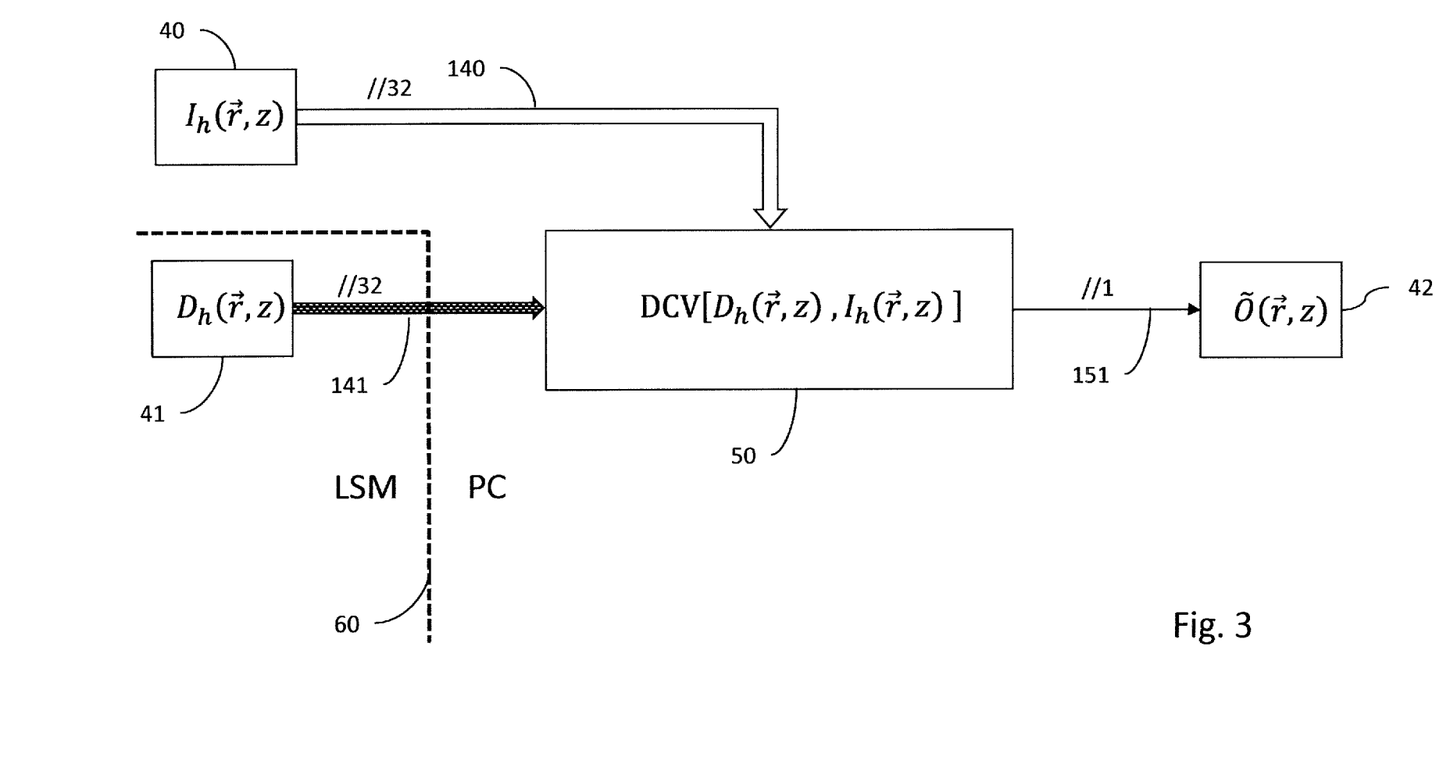
FIG. 3 shows a signal propagation chart for the microscopy method.

FIG. 3 illustrates all steps in a signal propagation chart. Starting point are the PSFs $I_h(\vec{r},z)$ (40) and the raw image signals $D_h(\vec{r},z)$ (41). The PSFs are known owing to the properties of the optical system. They can be computed from system parameters or be measured once and stored. The signals are transmitted via lines 140, 141 to the evaluation 50, which correspondingly deconvolutes and combines all raw image signals and outputs an image of the sample $\tilde{O}(\vec{r},z)$ (42) that corresponds to the original of the sample $O(\vec{r},z)$ as accurately as possible.

FIG. 3 and all other signal propagation charts show the amount of the data to be transmitted by way of the thickness of the arrows 140, 141, 151. There are 32 raw image signals $D_h(\vec{r},z)$, and 32 PSFs $I_h(\vec{r},z)$. The evaluation generates an image of the sample $\tilde{O}(\vec{r},z)$, the amount of data in said image is 32 times lower than that of all raw image signals. This is symbolized by the thin arrow 151. Likewise, the factor of the amounts of data with respect to a single image is indicated at the arrows. That is to say //32 for the raw image signals and PSFs, //1 for the image of the sample.

The dashed line 60 separates domains of the entire confocal microscope 20 between which the data of the raw image signals have to be transmitted. In this case, the domain LSM (laser scanning microscope) comprises hardware-related sectors of the confocal microscope, that is to say optics, mechanics and the electronics, which facilitate a data transfer to the PC domain. The domain PC constitutes the control and evaluation device C and consequently everything that is required for controlling the confocal microscope 20, for the further processing and for displaying the data. Usually, a personal computer C is the core of this domain. Specifically, the data of all raw image signals must be transferred from the LSM to the PC. This requires a powerful interface, and data transfer speed can be limited by an interface provided.

Figure 4:
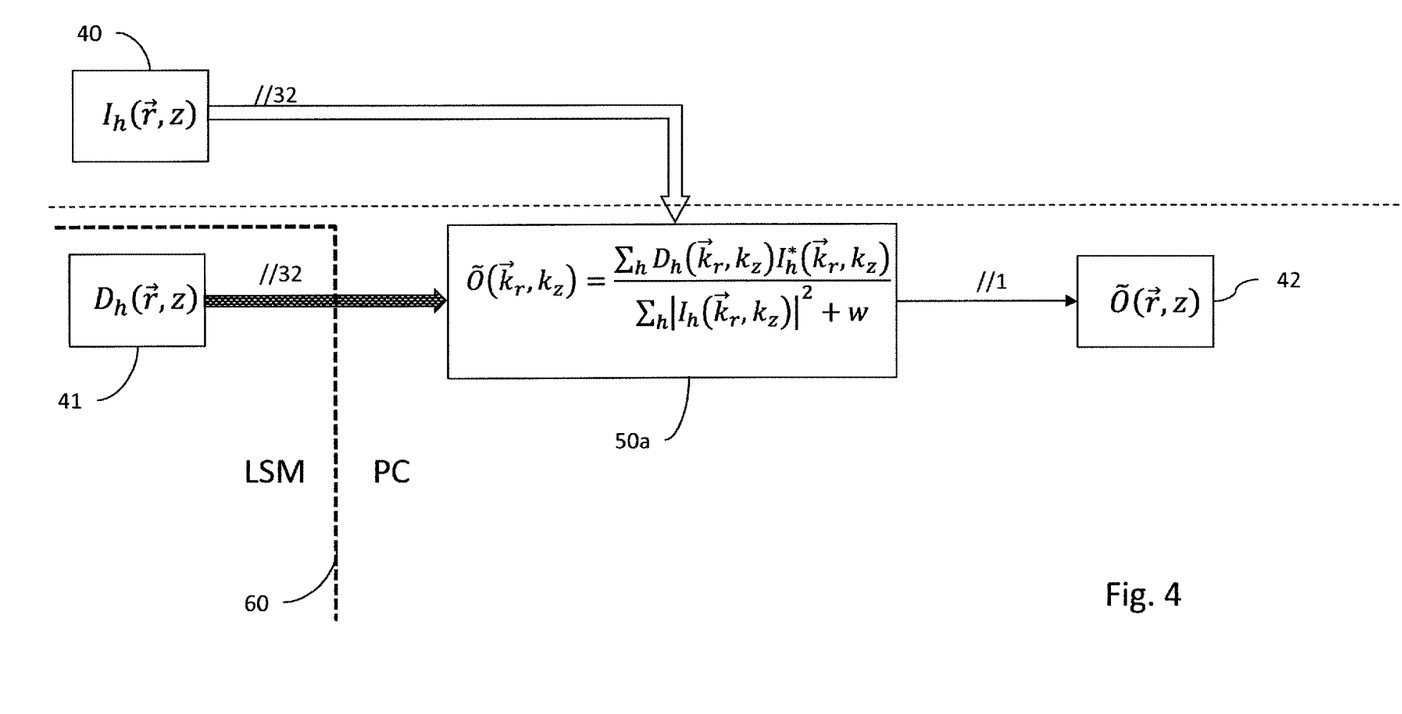
FIG. 4 shows an embodiment of the data processing of a high-resolution confocal microscope.

FIG. 4 shows a more specific embodiment of the data processing in a confocal microscope 20 with high resolution. Here, the evaluation unit 50a carries out so-called Wiener filtering. To this end, the raw image signals $D_h(\vec{r},z)$, which are represented in local coordinates, are initially subjected to a Fourier transform so that the raw image signals are now given in spatial frequency coordinates $D_h(\vec{k}_r,k_z)$. The same is done with the PSFs. The PSFs $I_h(\vec{k}_r,k_z)$ which have been transformed in Fourier space are referred to as object transfer function OTF.

Two aspects are important to understand the deconvolution formula in 50a:

1. The raw image signals correspond to the sample which is convoluted with the system PSF; as already illustrated above:

2. A convolution in real space corresponds to a multiplication in Fourier space. Thus, the raw image signals can be written in Fourier space as product of sample and OTF:

$$D_h(\vec{k}_r,k_z)=I_h(\vec{k}_r,k_z)\cdot O(\vec{k}_r,k_z)$$

If the formula for $D_h(\vec{k}_r,k_z)$ is inserted into the deconvolution formula, one obtains:

$$\tilde{O}(\vec{k}_r,k_z)=\frac{\sum_h I_h(\vec{k}_r,k_z)\cdot O(\vec{k}_r,k_z)\cdot I_h^*(\vec{k}_r,k_z)}{\sum_h |I_h(\vec{k}_r,k_z)|^2+w}=O(\vec{k}_r,k_z)\cdot\frac{\sum_h |I_h(\vec{k}_r,k_z)|^2}{\sum_h |I_h(\vec{k}_r,k_z)|^2+w}$$

$I_h^*(\vec{k}_r,k_z)$ denotes the OTF with conjugate-complex phase, the product with the (original) OTF then produces the square of the absolute value thereof.

w is a real positive number and shall be denoted as Wiener parameter in this case. If the Wiener parameter is small with respect to $\Sigma_h|I_h(\vec{k}_r,k_z)|^2$, the fraction approaches 1 and $\tilde{O}(\vec{k}_r,k_z)$ nearly corresponds to the original of the sample $O(\vec{k}_r,k_z)$. On the other hand, a w that is not too low ensures that the fraction does not diverge at points $(\vec{k}_r,k_z)$ where $\Sigma_h|I_h(\vec{k}_r,k_z)|^2$ is small. Such divergences would increase noise, which is inevitably present in the raw image signals $D_h(\vec{k}_r,k_z)$ and not illustrated here, beyond all measure and render the resulting image $\tilde{O}(\vec{k}_r,k_z)$ unusable.

In order to be able to display the image, the image $\tilde{O}(\vec{k}_r,k_z)$ which is given in spatial frequency coordinates must be transformed back into real space using inverse Fourier transform. Even though the actual deconvolution 50a is composed of comparatively simple computational steps (only additions and multiplications), the entire deconvolution process is complex. In particular, the Fourier transformation of all raw image signals $D_h(\vec{r},z)$ is computationally intensive and therefore time-consuming.

Figure 5:
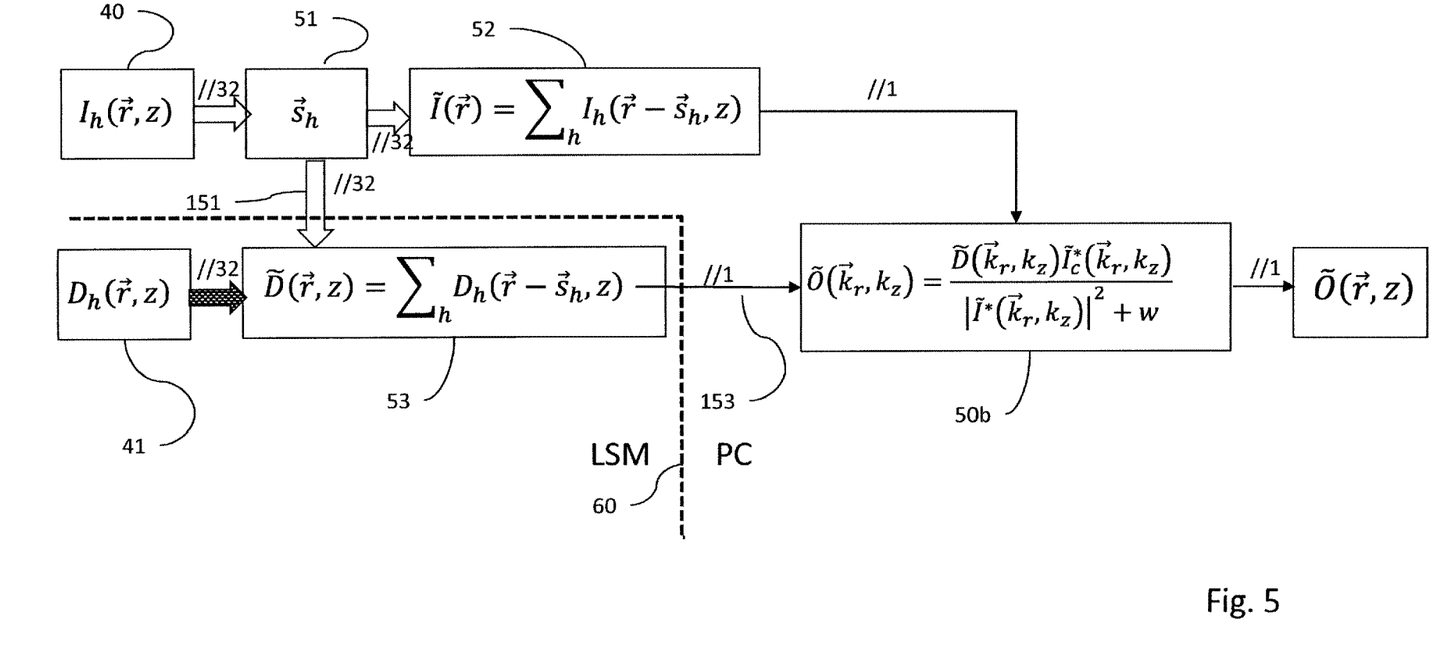
FIG. 5 shows alternative data processing to that of FIG. 4, FIGS. 6a-6c show mean transfer functions of the object transfer function of the microscope used.

One alternative for processing of the raw image signals is shown in FIG. 5. This alternative processing of the raw image signals takes advantage of the fact that the individual raw image signals substantially only differ from one another laterally, i.e., in $\vec{r}$-direction, by a displacement. The displacements $s_h$ 51 are a function of the PSFs $I_h(\vec{r},z)$ and can be calculated with relatively little effort. This now opens a processing route by way of approximation: The raw image signals are pushed back for the displacements $s_h$ and then added up 53. Such displacement is implemented in the same way for all planes z of the raw image signals. This results in a pre-processed raw image $\tilde{D}(\vec{r},z)$. A pre-processed PSF $\tilde{I}(\vec{r},z)$ 52 is calculated in the same way. In a further step 50b, the pre-processed raw image is deconvoluted with the pre-processed PSF and a deconvoluted raw image of the sample $\tilde{O}(\vec{r},z)$ is obtained. The advantages of this processing route consist in that, firstly, the pre-processing (53) is very simple and therefore quick. This allows the pre-processing to be carried out already prior to transferring the data to the PC 153, and so only one image has to be transferred instead of 32. This takes load from the interface between LSM and PC. Secondly, only the pre-processed raw image needs to be deconvoluted after the image was acquired. This likewise occurs much faster because only one Fourier transformation is required and because the summations are dispensed within the deconvolution. Overall, the entire pre-processing takes only a fraction of the time required beforehand.

Figure 6A:
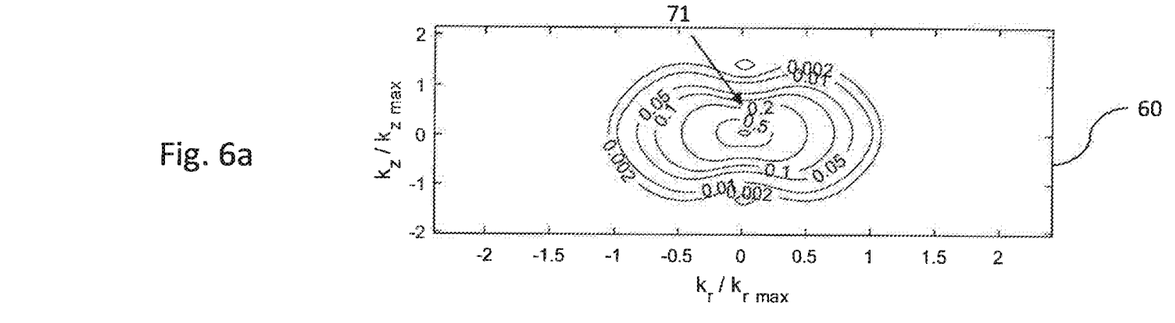
Figure 6B:
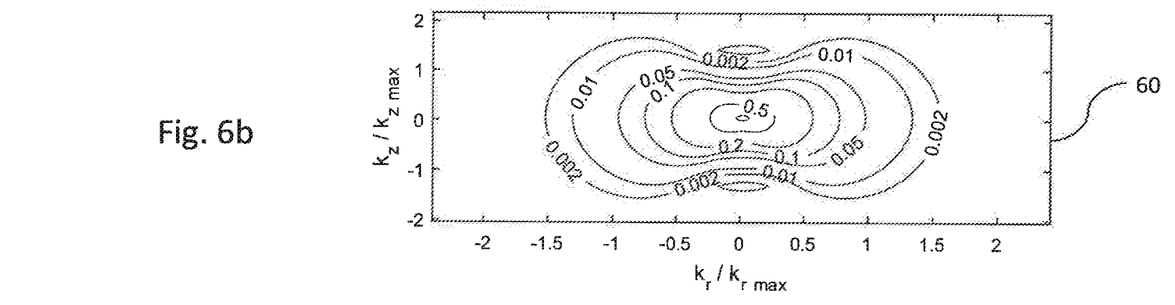
Figure 6C:
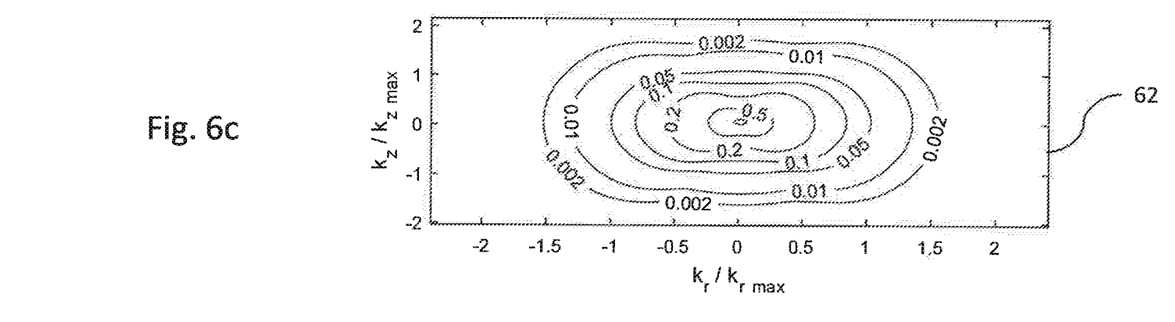

However, this advantage of the processing route is offset by a serious disadvantage. Reason is, the pre-processing does not take into account any properties of the raw image signals with respect to z, leading to the resolution in the z direction being reduced to the level achieved in a conventional confocal microscope. This is illustrated in FIG. 6. Diagrams a-c shown the "mean transfer function" MTF, which is defined as the absolute value of the OTF. The lateral spatial frequency is plotted along the x axis and the axial spatial frequency is plotted along the y axis. Both axes are normalized with respect to the limit frequency, in lateral and axial direction, respectively, of a wide field system. The amplitudes of the MTF are plotted as contour lines, normalized with respect to the amplitude at $\vec{k}_r$, $k_z=0$. High amplitudes of the MTF mean a good contrast in the image, or following the correction by the DCV, high amplitudes of the MTF mean a particularly low-noise image. FIG. 6a shows the MTF of a conventional confocal system with a single detector as illustrated in FIG. 2a. The lateral resolution of such a system approximately corresponds to that of a wide-field microscope, i.e., the maximum extent in the $\vec{k}_r$ direction reaches approximately 1. In the axial direction, there already is an increase in resolution over a wide field system. However, the axial resolution collapses on the axis, at $\vec{k}_r=0$. This is indicated by arrow 71 in FIG. 6a. By contrast, FIG. 6c illustrates the MTF as it may be achieved by a confocal microscope 20 with increased resolution if the raw images are pre-processed as described according to FIG. 3 or 4. The lateral resolution is increased by a factor of approximately 1.5, and there no longer is a collapse 71 of the MTF in $k_z$ direction on the axis. If the raw images are pre-processed using rapidly computing approximation according to FIG. 5, an increase in resolution is still achieved in the lateral direction. However, the collapse in the $k_z$ direction is not overcome in the axial direction. This is illustrated in FIG. 6b.

In order to achieve the advantages of fast processing without having to accept the disadvantages of the lower z-resolution, the evaluation is now implemented in a special way, namely in two stages.

Figure 7:
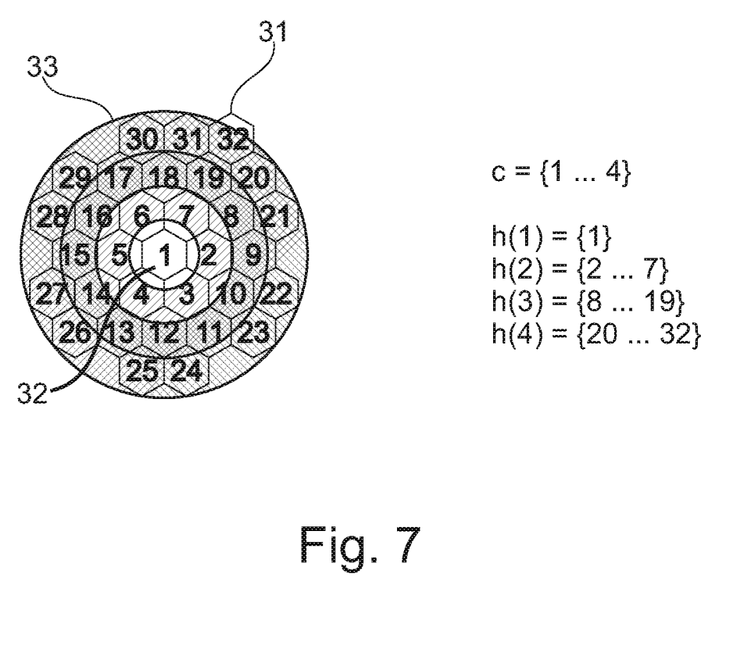
FIG. 7 is a schematic representation of the division of the pixels of the detector into groups.

To this end, FIG. 7 will be considered first. Here, the detector of FIG. 2b is shown again. The illumination light spot 14 is usually centred on the detector 17. Expressed differently, the centroid of the illumination light spot 14 coincides with the centroid of the first pixel 32. In the case of a PSF that is symmetrical (in particular rotationally symmetrical) with respect to the optical axis, the resolution in the axial ($k_z$) direction depends only on the distance of a pixel 32 relative to the illumination light spot 14, but not on the direction of the pixel 32 relative to the illumination light spot 14. In turn, this means that there are ring-shaped zones 33 on the detector having the same properties of the PSF in the axial direction. This effect is exploited in order to initially pre-process in two dimensional fashion data of all pixels within a ring. Here, the preprocessed PSF is not restricted in the axial direction—because it has the same property in axial direction. The pre-processed raw images obtained in this way are finally combined and deconvoluted in a further step, wherein the z properties of the pre-processed raw images can be taken into account in this step and hence the maximum resolution can be achieved in z direction, too.

The advantage of this two-stage evaluation is that the pre-processing of the images is considerably less computationally intensive, especially if it is carried out in two dimensions, i.e., does not generate any depth information—as a direct three-dimensional pre-processing according to FIG. 3 would do. The final—more complex—3D calculation is then only needs to be done with a reduced number of pre-processed raw images and is carried out correspondingly faster.

FIG. 7 is considered again with reference to the economy of this method. The exemplary detector can be divided into 4 ring zones c, for example. Ring zone I contains only the central detector element 1, ring zone II contains elements 2 . . . 6, ring zone III contains elements 7-19 and ring zone IV finally contains elements 20-32. Thus, 4 pre-processed raw images can be generated from the original 32 raw images, which pre-processed raw images contain only ⅛ of the original data volume.

Figure 8:
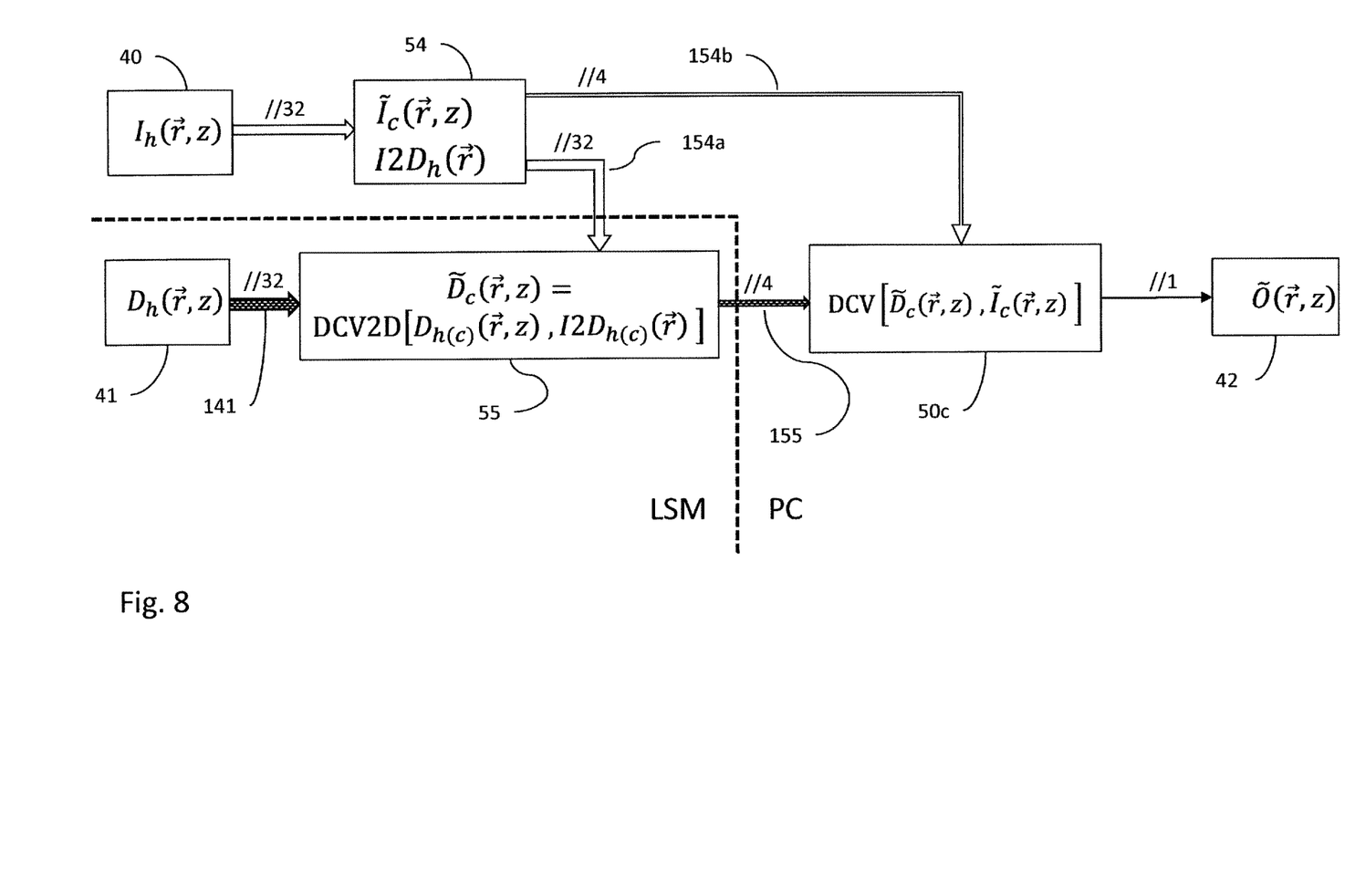
FIG. 8 shows the signal propagation chart for pre-processing images with an increased resolution in accordance with a first signal evaluation example.

FIG. 8 shows schematically the pre-processing for the confocal microscope 20. In a first evaluation example, all raw images $D_h$ are combined to form preprocessed raw images $\tilde{D}_c$ 55 in a first step. The combining is advantageously implemented in such a way that there is no loss of resolution in lateral direction. By way of example, all raw images can be initially deconvoluted in relation to their two-dimensional PSF $I2D_h(\vec{r})$. The combining 55 is then performed for each of the ring zones c of the detector 17. The number of pre-processed raw images is significantly lower than the number of raw image signals. In the example, there are 32 raw image signals but only 4 pre-processed raw images. The amount of data is therefore reduced by a factor of 8. This also reduces by a factor of 8 the amount of data 155 to be transferred from the LSM to the PC for the final processing 50c. The final DCV includes deconvolution and combination of the pre-processed raw images. To do this, the system determines the PSFs z) for the pre-processed raw images and deconvolutes the pre-processed raw images with these PSFs. In the end, the deconvolved image $\tilde{O}(\vec{r})$ of the sample is obtained, which image corresponding very precisely to the sample and can be displayed by conventional means.

Figure 9:
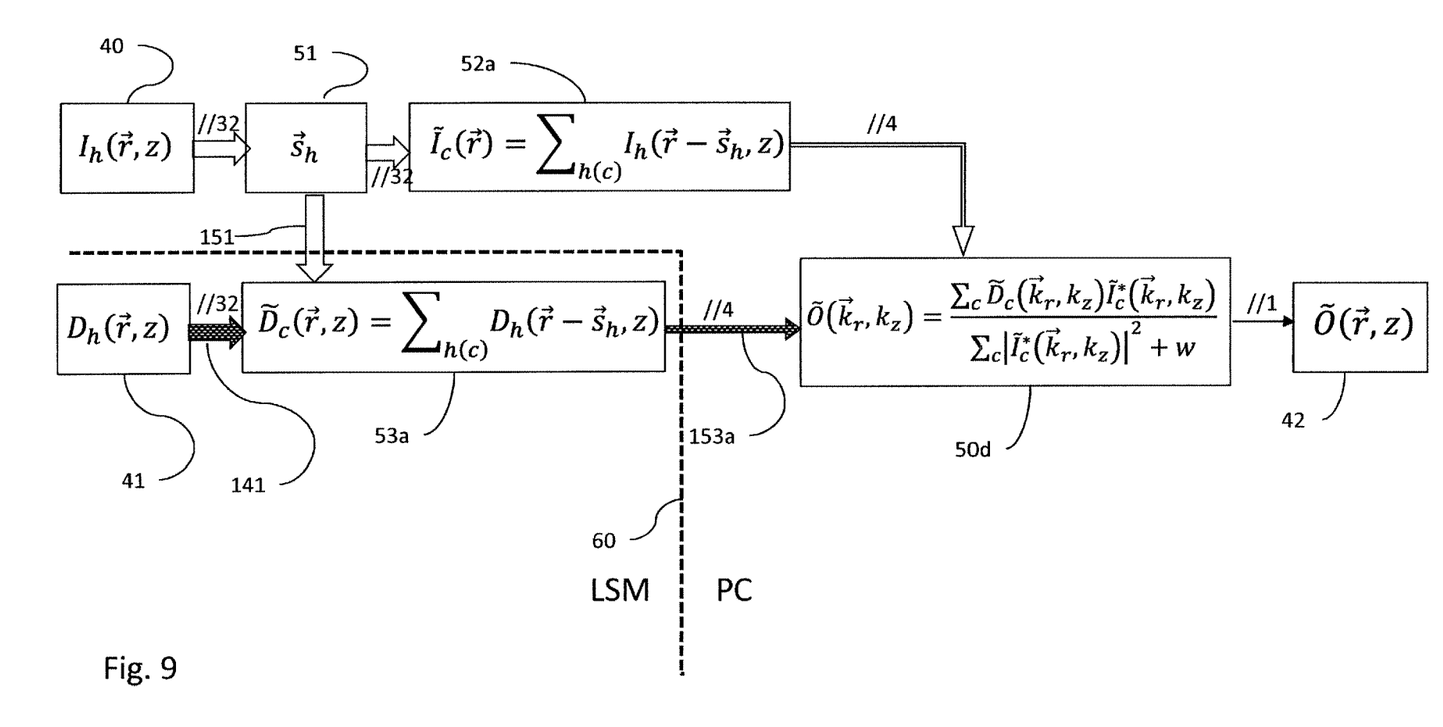
FIG. 9 shows an illustration similar to FIG. 8 in accordance with a second signal evaluation example.

FIG. 9 relates to a second evaluation example for the confocal microscope 20. It takes advantage of the fact that the individual raw image signals substantially only differ from one another laterally, i.e., in $\vec{r}$-direction, by a displacement. The displacements $s_h$ 51 are a function of the PSFs $I_h(\vec{r},z)$ and can be calculated with relatively little effort. For pre-processing, the displacement of the raw image signals is compensated and then all the raw image signals of a ring zone of the detector and displaced in this way are added up 53a. These computational steps can equally be carried out very quickly and already during image acquisition. The PSFs of the pre-processed raw images 52a are calculated in the same way. The pre-processed raw images are fed 153a to the final calculation 50d, then deconvoluted and added. In the example, use is made of a Wiener deconvolution as described in step 50a in FIG. 4. The Wiener deconvolution 50d can be carried out much faster on account of the reduced number of pre-processed raw images. In particular, only 4 images, and no longer 32, have to be Fourier transformed in the example of the invention. The Wiener deconvolution provides the final 3D image, which can be displayed using conventional means.

Figure 10A:
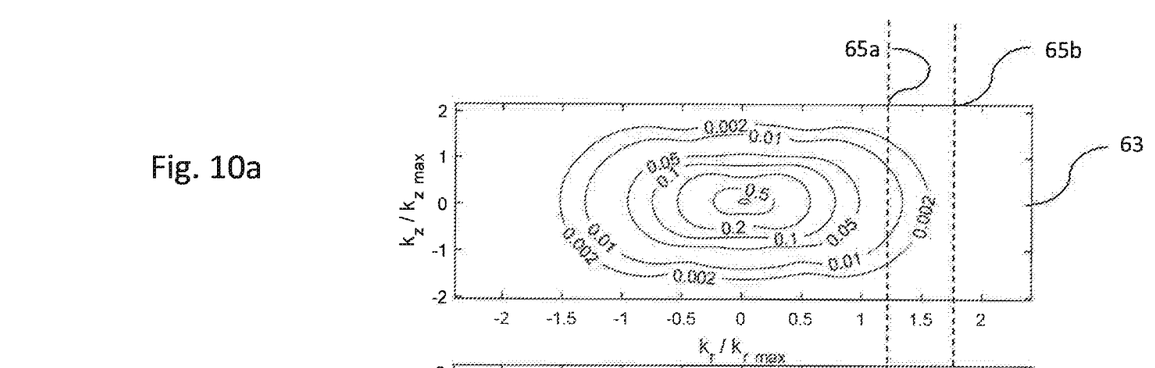
FIGS. 10a-10c show mean transfer functions for the various evaluation approaches.
Figure 10B:
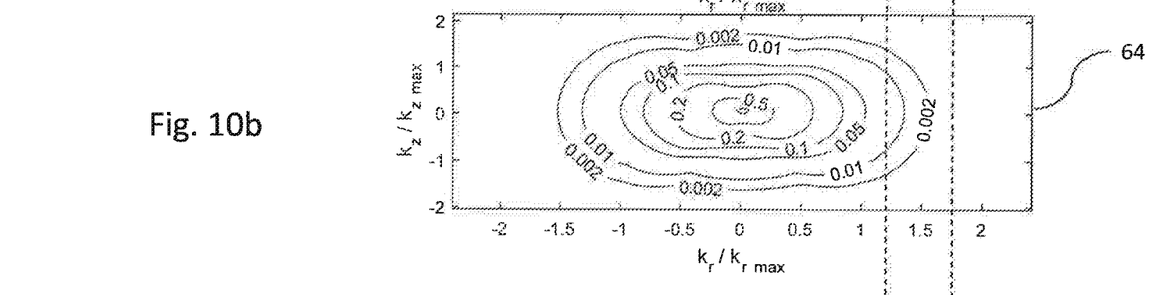
Figure 10C:
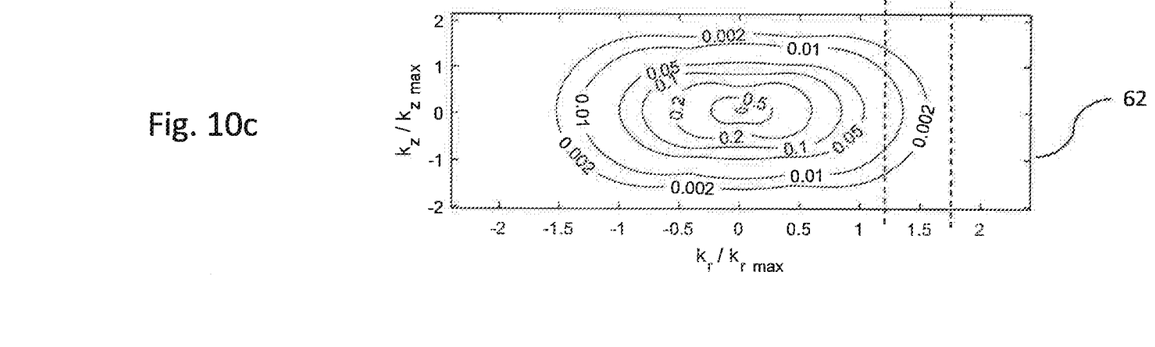

FIGS. 10a and 10b show MTFs of the confocal microscopes 20. For comparison, the MTF as provided by a system with conventional evaluation is shown in FIG. 10c. FIG. 10a shows the MTF of the second evaluation example as per FIG. 9. The collapse of the MTF in the $k_z$ direction at $\vec{k}_r=0$, as it occurs in FIG. 6b, is completely avoided. FIG. 10b shows the MTF of the first evaluation example, in which a 2D DCV was used in the pre-processing. Compared to the very fast method of the second evaluation example, there is a somewhat larger MTF amplitude in the lateral direction at spatial frequencies≈1. This is made visible by comparison line 65a. In FIG. 10b, this line touches the 0.05 MTF contour line; in FIG. 10a this contour line is somewhat more central. Expressed differently, the MTF on the comparison line 65a is somewhat lower than in FIG. 10b. Both embodiments work equally well again in the region of high lateral spatial frequencies. This is elucidated by the comparison line 65b. It shows that the 0.002 contour line reaches the same dimensions in both figures.

It should be noted that the differences between the two evaluation examples also depend on the parameters of the system. A total diameter of the detector area corresponding to 1.5 times the diameter of the Airy diffraction disk was used for all simulations. It was found that the differences are smaller for smaller diameters. Different forms of evaluation can be advantageous depending on the choice of parameters, and the provision of a plurality of forms of evaluation in one system, which are used depending on the choice of parameters, is also conceivable.

For comparison with the prior art, an MTF with an evaluation as per the prior art according to FIG. 3 is shown in FIG. 10c. It practically does not differ from the MTF of FIG. 10b. Hence, the two-stage evaluation achieves equally good results with substantially less computing time.

This is not restricted to the specifically mentioned embodiments. Even on a detector with different matrix ring regions, e.g., square matrix ring regions, it is possible to identify pixels that have a sufficiently similar PSF in the z direction, and to pre-process these pixels together. The number of zones can also be varied, e.g., 2, 3 or 5, 6.

Likewise, different pre-processings and final processings are conceivable for as long these largely maintain the advantage of increased resolution. By way of example, use can also be made of iterative deconvolution processes, which avoid the specific disadvantages of a Wiener deconvolution. In individual cases, use can also be of a method that does not give quite as good results, i.e., a slightly lower MTF, but requires less computational outlay. Use can also be made of deconvolution methods that do not require any knowledge of the system PSF (so-called blind deconvolution).

The format in which the pre-processed raw images are transferred to the final processing is not decisive. By way of example, it is conceivable to perform the pre-processing in spatial frequency space while the pre-processed raw images are not transformed back into real space but transferred as spatial frequency data. This is particularly advantageous if the final processing is likewise done in spatial frequency space. In this case, the final processing only still has to transform the data with respect to z, but not with respect to the lateral coordinates. This results in further time savings.

The location at which the pre-processing and the final processing occur is not decisive for the method. Thus, all raw image signals can also initially be transmitted via line 141 and the two-stage evaluation can be carried out entirely on the PC. In that case, the advantage of lower/faster data transfer is eliminated, but there is still an acceleration due to the lower overall computational outlay.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution scanning microscopy of a sample, comprising:
    illuminating the sample with illumination radiation by focusing the illumination radiation to a point in or on the sample to form a diffraction-limited illumination spot comprising a diameter;
    imaging the point in diffraction-limited manner to a diffraction image comprising a diffraction structure onto a 2D detector, the detector having pixels and a spatial resolution that resolves the diffraction structure of the diffraction image, wherein imaging in diffraction-limited manner comprises a resolution limit;

displacing the point relative to the sample into different scanning positions with a scanning increment less than the diameter of the illumination spot;
reading data from the 2D detector and assigned an actual scanning position to the data for each of the scanning positions, and
generating an image of the sample from the data and from the scanning positions assigned,
wherein the generating step comprises: assigning each of the pixels of the 2D detector either to a central group located on an optical axis or to at least one further group that surrounds the central group in ring-shaped fashion, calculating a pre-processed raw image for each group, and combining and deconvoluting the pre-processed raw images to generate the image of the sample having a resolution that is increased beyond the resolution limit.

2. The method as claimed in claim 1, wherein the pre-processed raw images are deconvoluted in three dimensions and a 3D image of the sample is generated.

3. The method as claimed in claim 1, wherein the groups include at least one additional ring-shaped surrounding group, wherein each ring-shaped group has an individual distance from the central group.

4. The method as claimed in claim 1, wherein four or five groups are provided.

5. The method as claimed in claim 1, wherein each pixel is assigned to exactly one of the groups.

6. The method as claimed in claim 1, wherein the pre-processed raw images are calculated by virtue of a two-dimensional deconvolution being carried out for each group.

7. The method as claimed in claim 1, wherein relative displacements of raw image signals contained in the data are calculated, the raw image signals are compensated with respect to displacement and the compensated raw image signals belonging to the same group are added to calculate the pre-processed raw image for this group.

8. A microscope for high-resolution scanning microscopy of a sample, comprising:
an illumination beam path for illuminating the sample with illumination radiation by focusing the illumination radiation to a point in or on the sample to form a diffraction-limited illumination spot having a diameter;
an imaging beam path for diffraction-limited imaging of the point into a diffraction image image comprising a diffraction structure onto an 2D detector, the detector having pixels and a spatial resolution resolving the diffraction structure, wherein diffraction-limited imaging manner comprises a resolution limit;
a scanning device for displacing the point relative to the sample into different scanning positions with a scanning increment less than the diameter of the illumination spot, and
an evaluation device configured to read data from the 2D detector and to assign an actual scanning position to the data for each scanning position,
wherein the evaluation device is further configured to generate an image of the sample from the data and from the scanning positions assigned by assigning each of the pixels of the 2D detector either to a central group located on an optical axis or to at least one further group that surrounds the central group in ring-shaped fashion, calculating a pre-processed raw image for each group, and combining and deconvoluting the pre-processed raw images to generate the image of the sample having a resolution that is increased beyond the resolution limit.

9. The microscope as claimed in claim 8, wherein the evaluation device is configured to deconvolute the pre-processed raw images in three-dimensions in order to generate the image the sample.

10. The microscope as claimed in claim 8, wherein the groups include at least one additional ring-shaped surrounding group, wherein each ring-shaped group has an individual distance from the central group.

11. The microscope as claimed in claim 8, wherein four or five groups are provided.

12. The microscope as claimed in claim 8, wherein each pixel is assigned to exactly one of the groups.

13. The microscope as claimed in claim 8, wherein the evaluation device is further configured to calculate the pre-processed raw images by carrying out a two-dimensional deconvolution for the groups.

\* \* \* \* \*

UNITED STATES PATENT AND TRADEMARK OFFICE
CERTIFICATE OF CORRECTION

PATENT NO. : 11,307,397 B2
APPLICATION NO. : 16/650252
DATED : April 19, 2022
INVENTOR(S) : Bathe et al.

It is certified that error appears in the above-identified patent and that said Letters Patent is hereby corrected as shown below:

In the Specification

Column 9, Line 13  now reads: "system determines the PSFs $z$) for the pre-processed raw"
should read --system determines the PSFs $\tilde{I}_c(\vec{r}, z)$ for the pre-processed raw--

Signed and Sealed this
Seventh Day of June, 2022

Katherine Kelly Vidal
*Director of the United States Patent and Trademark Office*